J. J. GAYNOR.
CONVEYER FOR BOTTLES AND THE LIKE.
APPLICATION FILED MAR. 13, 1916.
1,194,990.
Patented Aug. 15, 1916.
2 SHEETS—SHEET 1.
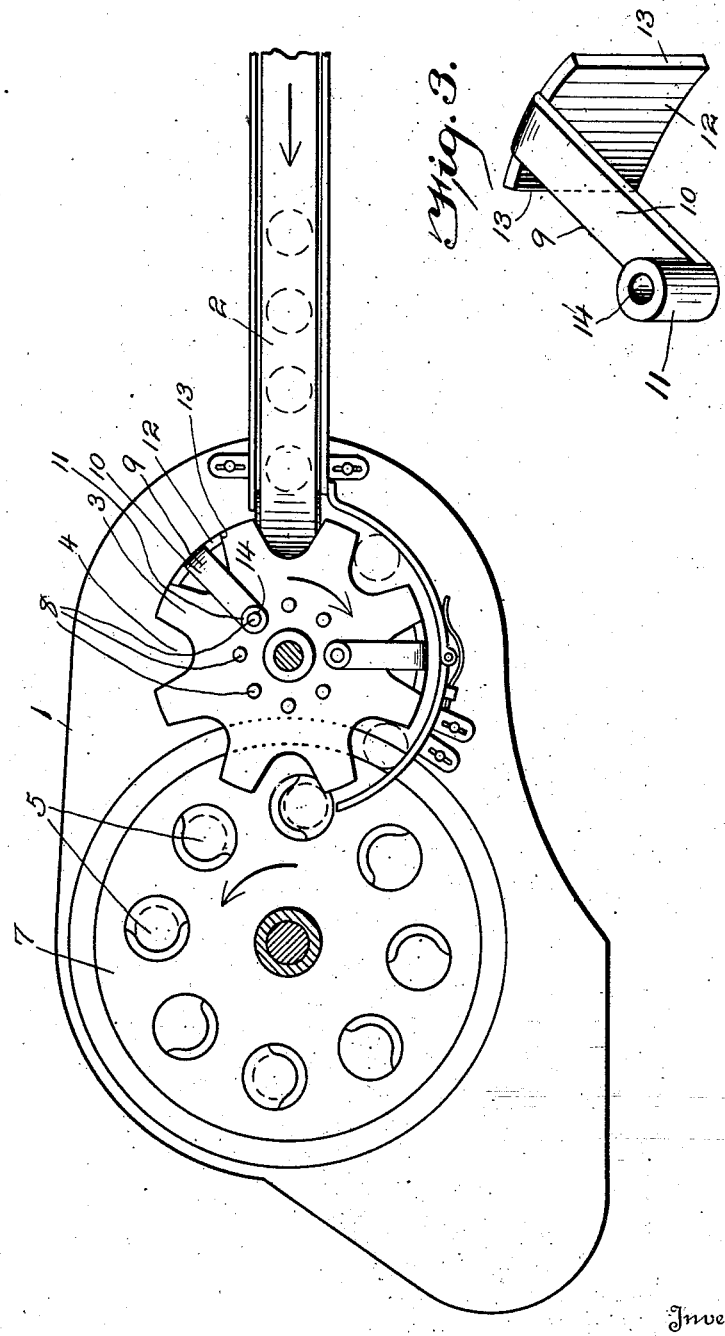

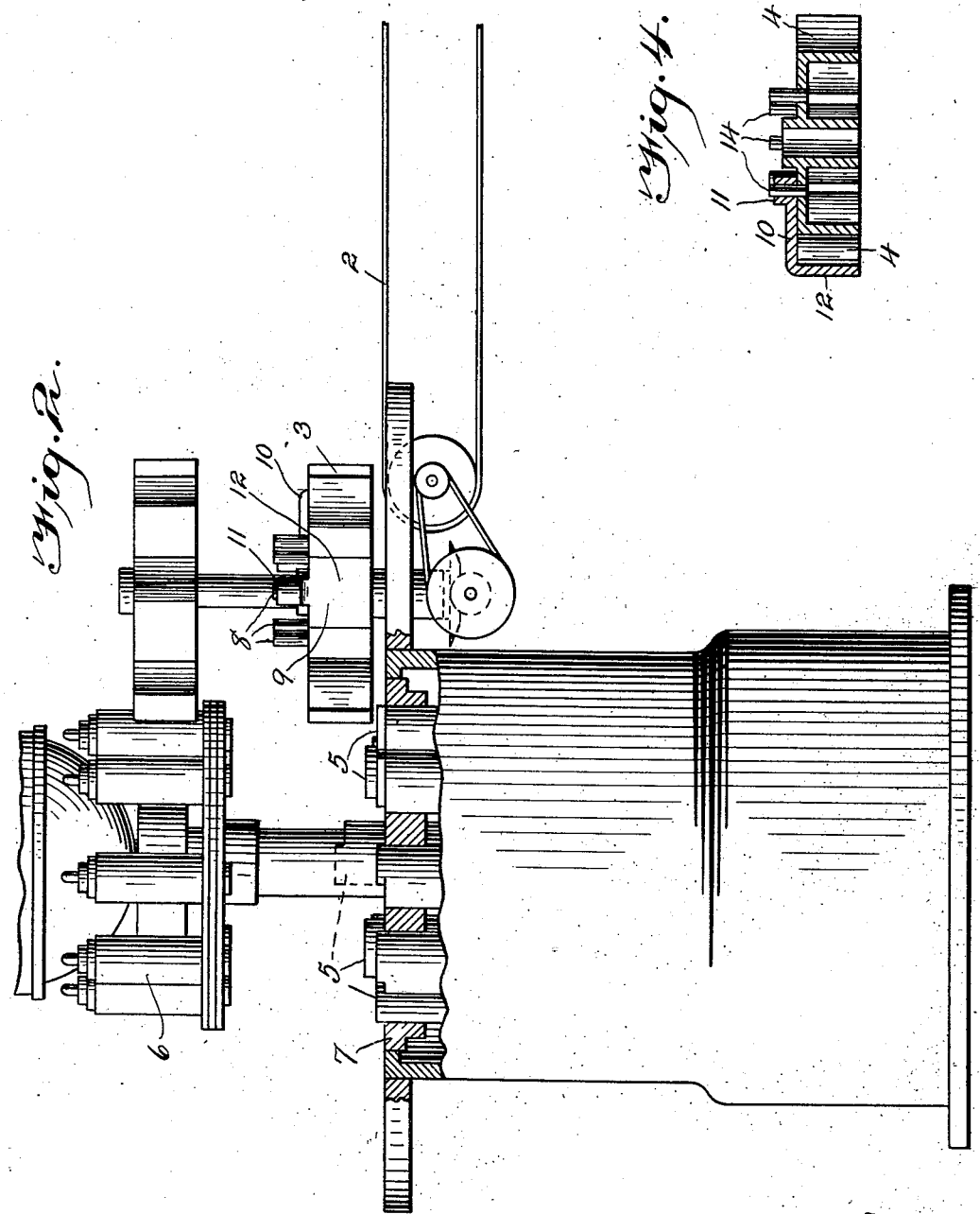

UNITED STATES PATENT OFFICE.

JOHN J. GAYNOR, OF INDIANAPOLIS, INDIANA.

CONVEYER FOR BOTTLES AND THE LIKE.

1,194,990.  Specification of Letters Patent.  Patented Aug. 15, 1916.

Application filed March 13, 1916. Serial No. 83,934.

*To all whom it may concern:*

Be it known that I, JOHN J. GAYNOR, citizen of the United States, residing at Indianapolis, in the county of Marion and State of Indiana, have invented certain new and useful Improvements in Conveyers for Bottles and the like; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in conveyers for bottles and the like, and has for its object to provide a novel star conveyer wheel and means for blocking one or more of its recesses so that it will fail to receive and convey one or more bottles or the like whenever it becomes necessary.

In machines of the type to which this invention relates such as bottle crowning or capping machines, a conveyer star wheel is usually employed to receive bottles from an endless conveyer and convey same to the rotating plunger-like bottle supports for the purpose of crowning or capping the same. These plunger-like bottle supports are movable vertically and frequently their mechanism becomes deranged so that one or more of the series are rendered useless. Under present conditions the machine has to be stopped and frequently dismantled in order to repair the deranged mechanism which of course results in great loss of time.

It is for the purpose of preventing the necessity of shutting down the machine upon the derangement of one or more of the plunger-like bottle supports that I have made this present invention, which consists in so blocking the star conveyer wheel that it will not receive and convey a bottle or bottles to one or more deranged plunger-like bottle supports, so that any deranged plunger-like bottle supports will not receive bottles to be crowned or capped, while the properly operating plunger-like bottle supports will receive their bottles from the star-conveyer wheel for crowning or capping. In this way the machine can be kept running and the capping operation continued uninterruptedly.

Referring to the accompanying drawings: Figure 1 is a horizontal section of so much of a bottle crowning or capping machine as is necessary to illustrate this invention. Fig. 2 is an elevation partly in section of the same. Fig. 3 is a perspective view of one of the star conveyer wheel blocking devices and Fig. 4 is a vertical sectional view through the star conveyer wheel and one of the blocking devices in operative position.

Like numerals of reference indicate the same parts throughout the several figures in which:

1 indicates a bottle crowning or capping machine which includes a bottle conveyer 2 for conveying bottles to the star conveyer wheel 3, said wheel having a series of recesses 4 each to receive a bottle from the conveyer 2 and convey the same to the rotating plunger-like bottle supports 5 which rotate with the capping heads 6, and in connection therewith effect the crowning or capping operation. There are as many recesses 4 in the star conveyer wheel as there are plunger like bottle supports 5, and as the star conveyer wheel 3 and the rotating table 7 rotate in opposite directions, the same recess 4 in the star conveyer wheel will meet the same plunger-like bottle support 5 at every revolution. If therefore one or more of the plunger-like bottle supports 5 are deranged, the star-conveyer wheel can be caused to fail to convey one or more bottles to the deranged plunger-like bottle support or supports in the manner as will be now described.

It will be seen from the drawings that the star conveyer wheel is provided with a series of vertical upstanding pins or studs 8 to agree in number with the recesses 4 in said wheel, and it will also be seen that I employ one or more star conveyer wheel blocking devices 9, each of which consists of a flat frame or body 10 terminating at one end in an upstanding apertured boss 11, and at the other end with a depending flange 12, the vertical edges 13 of which are beveled or otherwise formed to fit and conform to the walls of a recess 4 in the star conveyer wheel in the manner as shown in Fig. 1, the flange 12 being formed on an arc to agree with the circumference of the star conveyer wheel, while the aperture 14 in the upstanding boss 11 forms a close sliding fit with any one of the upstanding pins or studs 8 on the conveyer wheel.

Having thus described the several parts of the invention its operation is as follows: Whenever it becomes necessary to cut out a bottle or bottles from one or more of the plunger-like bottle supports 5 by reason of derangement thereof, and it is desired to keep the machine in operation, one or more of the blocking devices 9 is placed in position on the star-conveyer wheel at the recess or recesses 4 which normally meet and deliver bottles to the plunger-like supports which are deranged. The depending flanges 14 of the blocking device or devices 9 fill the entrance to their recess or recesses, and as they conform to the circumference of the star conveyer wheel, no bottle or bottles are received in the blocked recesses from the bottle conveyer 2, so that no bottle or bottles are delivered by the star conveyer wheel 3 to the deranged plunger-like bottle supports 5, but are conveyed as normally to the operative plunger-like bottle supports 5 so that the crowning or capping operation can be carried on uninterruptedly until such time as it is convenient to repair the deranged plunger-like bottle supports.

By means of this device the complete shutting down of a crowning or capping machine is prevented.

Having thus fully described the invention I do not wish to be understood as limiting myself to the exact construction shown and described, but consider myself clearly entitled to all such changes and modifications as fall within the limit and scope of the appended claims.

What I claim as new and desire to secure by Letters Patent of the United States is—

1. The combination with a conveyer of a star conveyer wheel provided with article receiving recesses at the periphery thereof, to receive articles from said conveyer in said recesses, a series of pins or studs on said star conveyer wheel agreeing in number with the said recesses in said wheel, a recess blocking device including a flat body portion provided at one end with an upstanding apertured boss for connection with any of said pins or studs on said wheel and at the other end a depending recess blocking element having its vertical edges shaped to conform to the walls of any of said recesses in said wheel, said depending recess blocking element being formed on an arc to agree with the circumference of said star conveyer wheel, substantially as described.

2. The combination with a conveyer of a star conveyer wheel provided with article receiving recesses at the periphery thereof, to receive articles from said conveyer in said recesses, a series of pins or studs on said star conveyer wheel agreeing in number with the said recesses in said wheel, a recess blocking device including a flat body portion provided at one end with an upstanding apertured boss for connection with any of said pins or studs on said wheel and at the other end a depending recess blocking element having its vertical edges shaped to conform to the walls of any of said recesses in said wheel.

3. The combination with a conveyer of a star conveyer wheel provided with article receiving recesses at the periphery thereof, to receive articles from said conveyer in said recesses, a series of pins or studs on said star conveyer wheel agreeing in number with the said recesses in said wheel, a recess blocking device including a flat body portion provided at one end with an upstanding apertured boss for connection with any of said pins or studs on said wheel and at the other end a depending recess blocking element.

4. The combination with a conveyer of a star conveyer wheel provided with article receiving pockets at the periphery thereof to receive articles from said conveyer, a recess blocking element for said star conveyer wheel and means for attachment of said recess blocking element on said star conveyer wheel.

5. The combination with a star conveyer wheel having recesses in its periphery for the reception of articles, of a recess blocking element and means for removably attaching the same to said star conveyer wheel.

6. The combination with a rotary conveyer having peripheral recesses into which are fed and conveyed articles, of an element adapted to form a closure for the entrance of any of said recesses and for attachment to said conveyer.

7. The combination with a rotary conveyer having peripheral recesses into which are fed and conveyed articles, of an element adapted to enter any of said recesses and conform at its outer portion to the general outline of the periphery of said conveyer, for closing the entrances to said recesses.

In testimony whereof, I affix my signature, in presence of two witnesses.

JOHN J. GAYNOR.

Witnesses:
C. HUGH DUFFY,
T. P. BRITT.